UNITED STATES PATENT OFFICE.

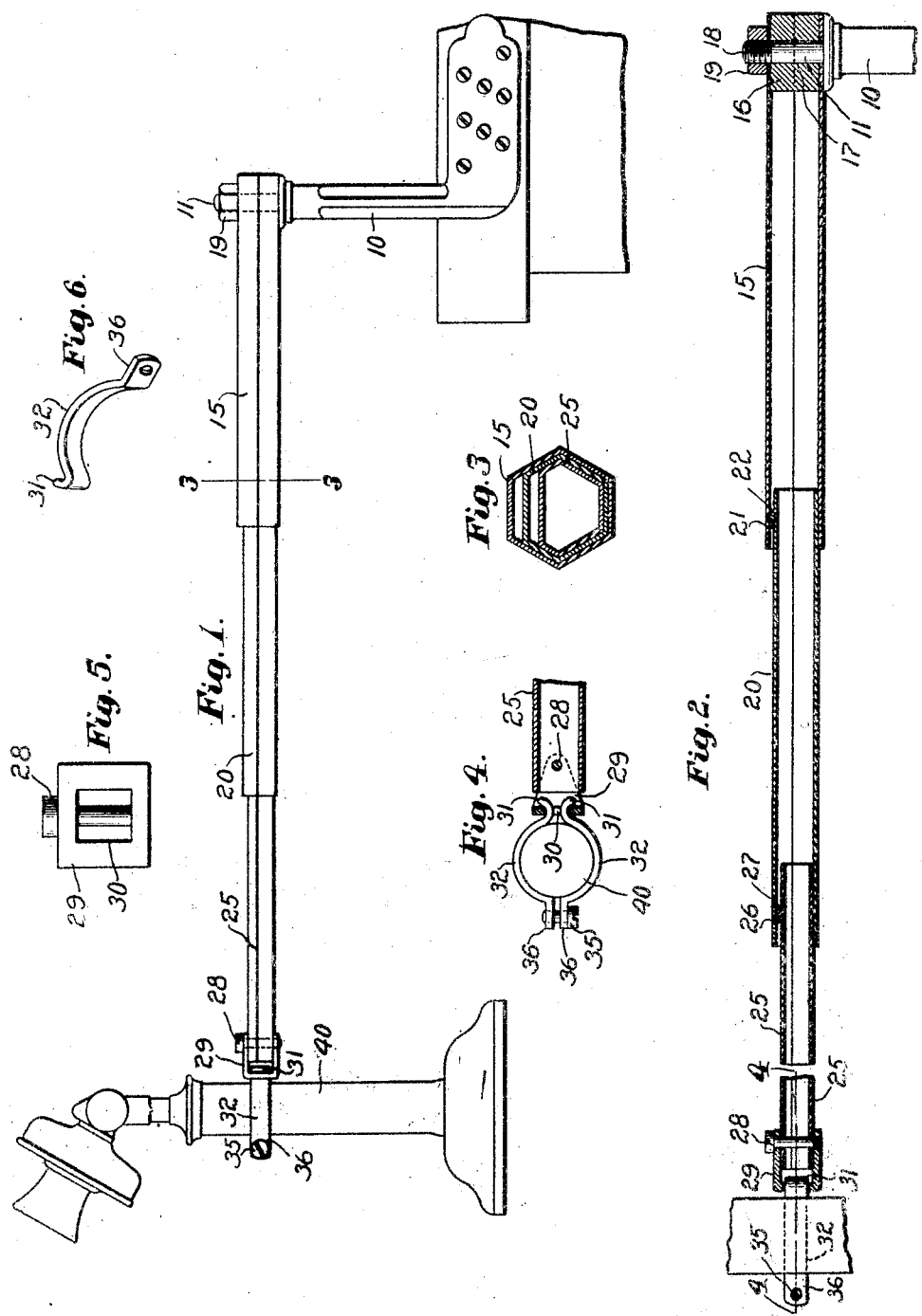

HARRY BLUMENTHAL, OF DORCHESTER, MASSACHUSETTS.

TELEPHONE-SUPPORT.

960,151.  Specification of Letters Patent.  Patented May 31, 1910.

Application filed July 31, 1909. Serial No. 510,584.

*To all whom it may concern:*

Be it known that I, HARRY BLUMENTHAL, a citizen of the United States, and a resident of Dorchester, Suffolk county, Commonwealth of Massachusetts, have invented an Improvement in Telephone-Supports, of which the following description, in connection with the accompanying drawings, is a specification, like numerals on the drawings representing like parts.

This invention relates to supports and pertains more particularly to a telephone support having various features of improvement over those heretofore known in the art.
For illustration I have shown in the accompanying drawing one of the embodiments of which my invention is susceptible.

In the drawing: Figure 1 is a side elevation of the telephone support extended and embodying features of my invention. Fig. 2 is an enlarged central vertical-longitudinal section of the support. Fig. 3 is an enlarged vertical section on line 3—3 of Fig. 1 when the telephone support is collapsed. Fig. 4 is a sectional plan on line 4—4 of Fig. 2. Fig. 5 is an enlarged end elevation of my clamp supporting base. Fig. 6 is a detail of one of the telephone supporting members.

Referring to the figures, I secure in any convenient manner to a pillar, desk or stand a suitable supporting base 10 at the top of which is a vertical threaded stud or shaft 11 upon which is swiveled the telephone support. Preferably, I have herein illustrated a hollow, regular, polygonal member 15 having secured in one end thereof a suitable reinforcing block 16 having therethrough a bore 17, through which is passed the stud or shaft 11 upon the threaded end of which is a screw threaded nut 19 to effectively prevent the withdrawal of the member 15 from said stud or shaft. The polygonal member 15 is so positioned axially that two or more of its faces on either side form angular bearing faces to prevent relative vertical displacement of the several telescopic members hereinafter described.

A hollow telescopic polygonal member 20, that permits of sliding and holding faces throughout but a portion of its periphery is inserted within the member 15 to slide longitudinally thereof. That is, the member 20, differing from 15, is an equiangular, but irregular polygon, having all but one of the faces of the polygonal member 20 contact with the faces of member 15 to form bearing faces to prevent vertical displacement of one member relative to the other as best illustrated in Fig. 3, and where one adjacent face of the member 20 is separated from its adjacent face on member 15 by some distance, so that grit or cinders may not wedge between the adjacent faces to prevent relative movement of the telescopic members.

A suitable limiting means may be employed between the adjacent separate faces of members 15 and 20 respectively. Preferably however, at the desired distance I depress a small portion of the inner face of member 15 forming a protuberance 21, and raise a small portion of the outer face of member 20 forming thereby a protuberance 22. These adjacent protuberances just clear the adjacent face of the other member when relative longitudinal movement is imparted to the member 20, but such protuberances will not permit of their passing each other when it is attempted to withdraw the member 20 from within the member 15. Similarly, a member 25 within the member 20 is an equiangular, but relatively irregular polygon so that, as before stated, all but one of the faces of the member 25 are in sliding contact with the inner faces of the member 20 to form bearing faces to prevent similar vertical displacement as that before mentioned as between the members 15 and 20 (see Fig. 3). Between the adjacent separated faces of the members 20 and 25 I employ similar protuberances 26, 27, extending from adjacent separated faces interiorly and exteriorly of the members 20 and 25 respectively.

Pivotally mounted upon the end of member 25 by means of a screw 28 is a clamp supporting base 29 preferably of U shaped construction and having a telephone clamp receiving orifice 30 within which are inserted the outturned ends 31—31 of relatively independent semi-circumferential telephone supporting members 32—32 between which is placed the body portion or grip 40 of the desk telephone outfit. The outturned ends 31—31 of the relatively independent semi-circumferential members 32 are inserted within the orifice 30 and the said semi-circumferential members are drawn snugly about the telephone grip and securely held in their gripping position by means of a screw 35 through substantially radial ears 36—36 (see Fig. 4) upon the said semi-circumferential members, thus providing a simple and effective removable attaching means for securing the telephone to the support.

As before mentioned the supporting base is secured to any suitable desk or the like and the telephone support is moved about the stud or shaft 11 carrying with it the telephone, so that the same may be within convenient distance where it may be reached at the will of the operator. When it is desired to use the telephone, the operator may swing the telephone toward him and at the same time impart relative movement to the various telescopic members, thus bringing the telephone within the proper speaking distance, and by turning the telephone with its swiveled attachment upon the screw 28, adjust the telephone thereby to any convenient angle to suit said operator.

I have described herein one embodiment of my invention, but it is to be understood that the latter is not essentially limited to the details of construction and organization of said embodiment, since the same may be varied without departing from the proper scope of the claims.

Claims:

1. A telephone support of the character described, comprising, in combination, a base, a polygonal member swiveled thereon, a plurality of equiangular but irregular polygonal members movable within the first mentioned member and relatively movable longitudinally one within the other, and means secured to the innermost member for gripping a telephone.

2. A telephone support of the character described, comprising, in combination, a base, a polygonal member swiveled thereon, a plurality of equiangular but irregular polygonal members movable within the first mentioned member and relatively movable longitudinally one within the other, a member swiveled on the innermost polygonal member, and a plurality of semi-circumferential clamp members including outturned portions to engage with the swiveled member.

3. A telephone support of the character described, comprising in combination with a base and swiveled thereon, a plurality of equiangular but irregular polygonal members relatively movable longitudinally one within the other, limiting means upon the adjacent irregular faces of the polygonal members, a member swiveled upon the innermost polygonal member for securing thereto telephone gripping means, and semi-circumferential telephone gripping means to engage with the swiveled member.

In testimony whereof, I have signed my name to this specification in the presence of two subscribing witnesses.

HARRY BLUMENTHAL.

Witnesses:
HARRY H. HAM,
VICTOR H. GURNEY.